United States Patent [19]

Inoue

[11] Patent Number: 4,832,284
[45] Date of Patent: May 23, 1989

[54] APPARATUS FOR DRAWING OUT A LEADER BLOCK IN A TAPE CARTRIDGE FOR A MAGNETIC INSTRUMENT

[75] Inventor: Yoshihisa Inoue, Hannou, Japan

[73] Assignee: Nakamichi Corporation, Kodaira, Japan

[21] Appl. No.: 113,166

[22] Filed: Oct. 23, 1987

[30] Foreign Application Priority Data

Oct. 27, 1986 [JP] Japan .................. 61-254873

[51] Int. Cl.$^4$ .......................................... G11B 15/66
[52] U.S. Cl. ..................................... 242/195; 360/95; 226/92
[58] Field of Search ................. 242/195, 197; 360/90, 360/93, 95; 226/91, 92

[56] References Cited

U.S. PATENT DOCUMENTS

| | | | |
|---|---|---|---|
| 4,432,508 | 2/1984 | Inoue et al. .................. | 242/195 |
| 4,477,851 | 10/1984 | Dalziel et al. ................ | 242/195 X |
| 4,646,177 | 2/1987 | Sanford et al. ............... | 242/195 X |
| 4,704,645 | 11/1987 | Murphy et al. ............... | 360/95 |

FOREIGN PATENT DOCUMENTS

171773 10/1983 Japan .
13097 3/1984 Japan .

*Primary Examiner*—David Werner
*Attorney, Agent, or Firm*—Pearne, Gordon, McCoy & Granger

[57] ABSTRACT

An apparatus for drawing out a leader block in a tape cartridge for a magnetic instrument comprising engagement means movably provided in leader block guide means for guiding and driving the leader block along a predetermined guide path so that the leader block is associated with the leader block guide means in accordance with the tape cartridge entering the magnetic instrument and so that the leader block is released out of the leader block guide means in accordance with the tape cartridge being removed out of the magnetic instrument.

2 Claims, 10 Drawing Sheets

APPARATUS FOR DRAWING OUT A LEADER BLOCK IN A TAPE CARTRIDGE FOR A MAGNETIC INSTRUMENT

BACKGROUND OF THE INVENTION

A tape cartridge having a leader block provided therein has been used for a magnetic instrument which is provided as a peripheral equipment for a computer to back up informations. The leader block is connected to a leader end of a tape wound on a single reel in the tape cartridge to guide the tape along a predetermined guide path to a winding reel in the magnetic instrument while it is associated with a drawing pin member in the magnetic instrument.

Such a drawing pin member is disclosed in Japanese Application Publication No. 13,097/1984, for example. In the prior art, there is provided a cylindrical drawing pin member including a thinner cylindrical portion and an enlarged end provided integrally with the end of the cylindrical portion to engage a slot in the leader block which slot has a recess provided corresponding to the enlarged end. In operation, the cylindrical portion is inserted into the slot with the enlarged end being shifted from the slot and then the tape cartridge is moved whereby the leader block is moved in a direction in which the drawing pin member extends to engage the recess with the enlarged end so that the leader block is connected to the drawing pin member. Such a movement of the drawing pin member is accomplished by a linkage.

The peripheral equipment for the computer has been compacted, which requires the magnetic instrument to be also compacted. However, since the drawing pin member has at least a length which is equal to the total of the slot length of the leader block and the movement length thereof, the length of the drawing pin member becomes larger, which causes the magnetic instrument to be higher and the strength of the drawing pin member to be poorer. This prevents the drawing pin member from being accurately positioned.

SUMMARY OF THE INVENTION

Accordingly, it is a principal object of the invention to provide an apparatus for drawing out a leader block in a tape cartridge for a magnetic instrument adapted to make a drawing pin member shorter whereby a magnetic instrument can be compacted.

It is another object of the invention to provide an apparatus for drawing out a leader block in a tape cartridge for a magnetic instrument in which a drawing pin member can be accurately positioned.

In accordance with the present invention, there is provided an apparatus for drawing out a leader block contained in a tape cartridge for a magnetic instrument having a single reel and connected to a leader end of a tape in the tape cartridge comprising;

leader block guide means to guide and drive said leader block along a guide path;

engagement means movably provided in said leader block guide means so that said leader block is connected to said leader block guide means;

said leader block being released out of said leader block guide means by moving said engagement means relative to said leader block guide means in accordance with said tape cartridge being removed out of said magnetic instrument;

and said leader block being connected to said leader block guide means by moving said engagement means relative to said leader block guide means in accordance with said tape cartridge being inserted into said magnetic instrument.

BRIEF DESCRIPTION OF THE DRAWINGS

The above and other objects and features of the invention will be apparent from the description of the embodiments of the invention taken along with the accompanying drawings in which;

FIG. 4b is an enlarged plane view of the leader block in the tape cartridge of FIG. 4a;

FIG. 7b illustrates in cross section the positioning means of FIG. 7a;

FIG. 7c perspectively illustrates in an explosive manner the positioning means of FIG. 7a;

DETAILED DESCRIPTION OF PREFFERED EMBODIMENTS

Figure 1:
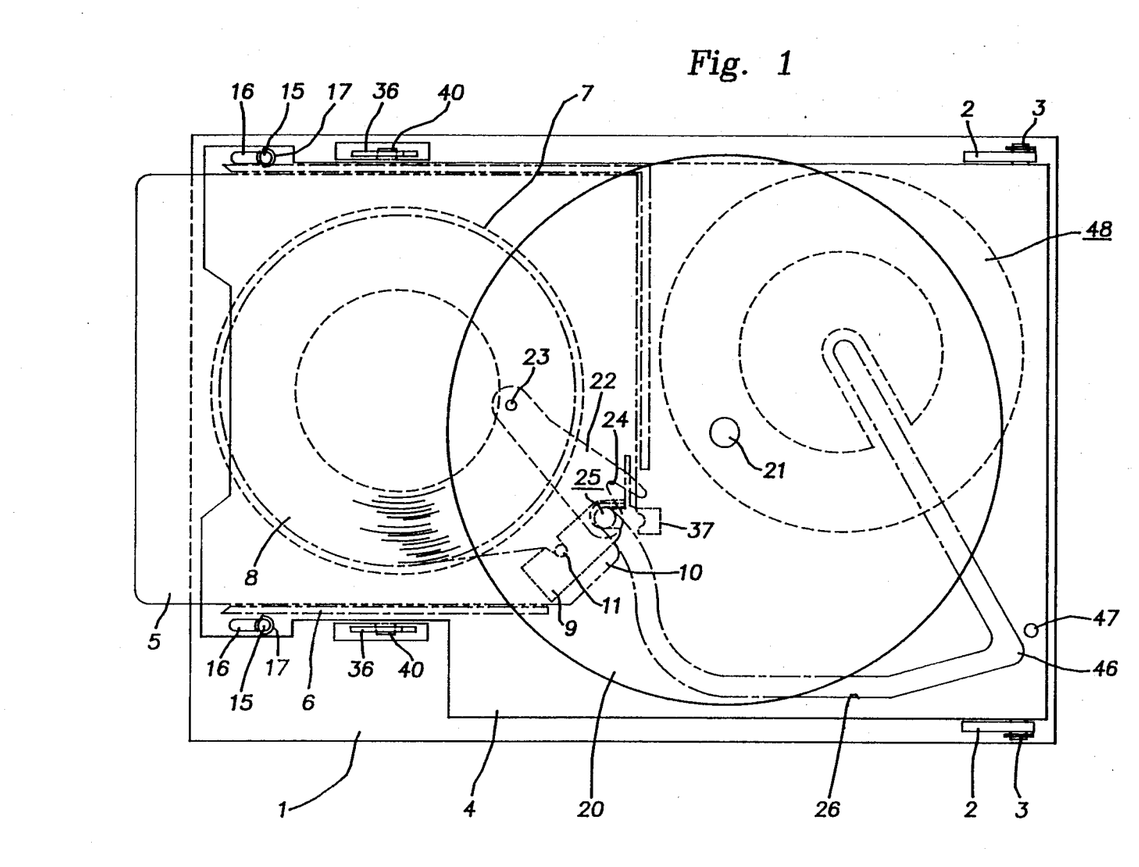
FIG. 1 is a plane view of an apparatus for drawing out a leader block constructed in accordance with the invention with a tape cartridge located at an operation position.
Figure 2:
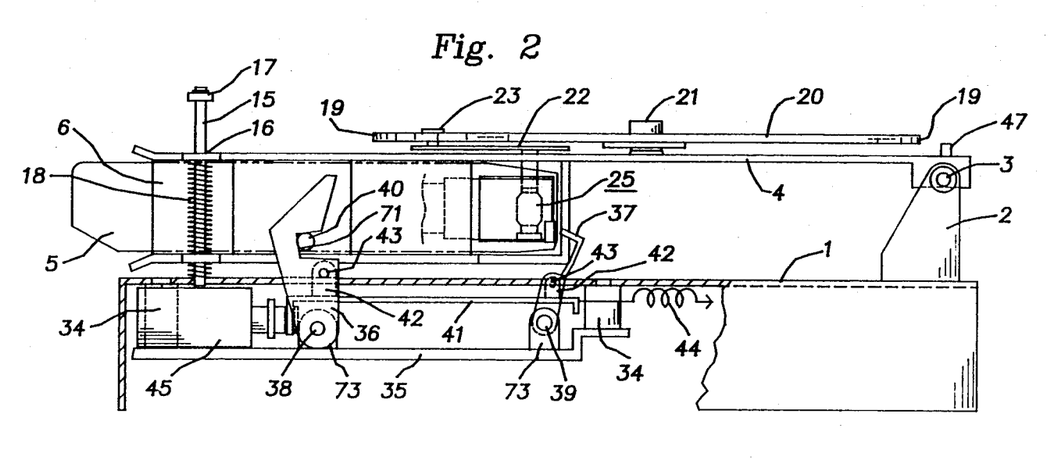
FIG. 2 is a side elevational view of the apparatus of FIG. 1.
Figure 3:
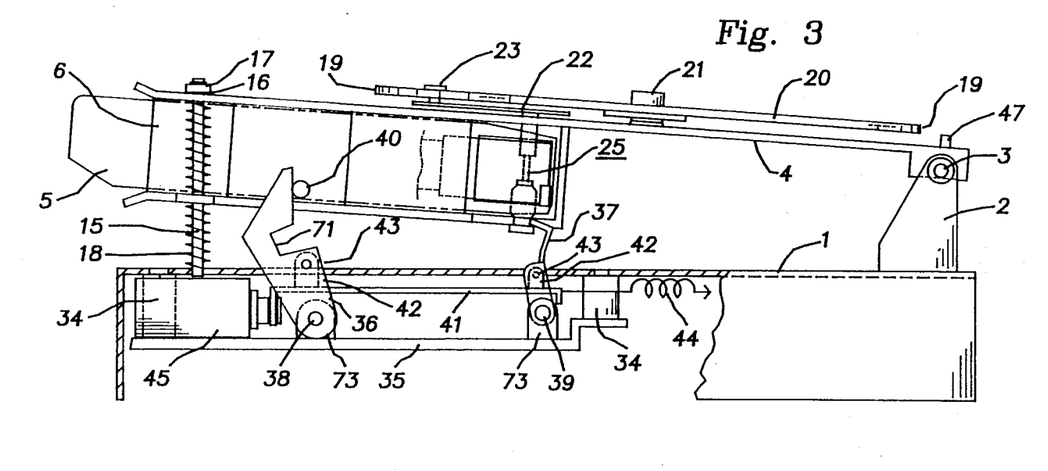
FIG. 3 is a side elevational view of the apparatus with the tape cartridge located at a position where the tape cartridge is able to enter the magnetic instrument or to be removed out of the magnetic instrument.

Referring now to FIGS. 1 through 3, there is shown an apparatus for drawing out a leader block 9 contained in a tape cartridge 5 for a magnetic instrument such as magnetic storage, for example, having a single reel 7 and connected to a leader end of a tape 8 in the tape cartridge 5. The tape cartridge 5 is contained in a cartridge holder 6 which is provided on a holder base plate 4 having one end pivotally mounted on a chassis 1 of a magnetic instrument at bracket 2 and 2 by a pivotal pin 3.

Figure 4A:
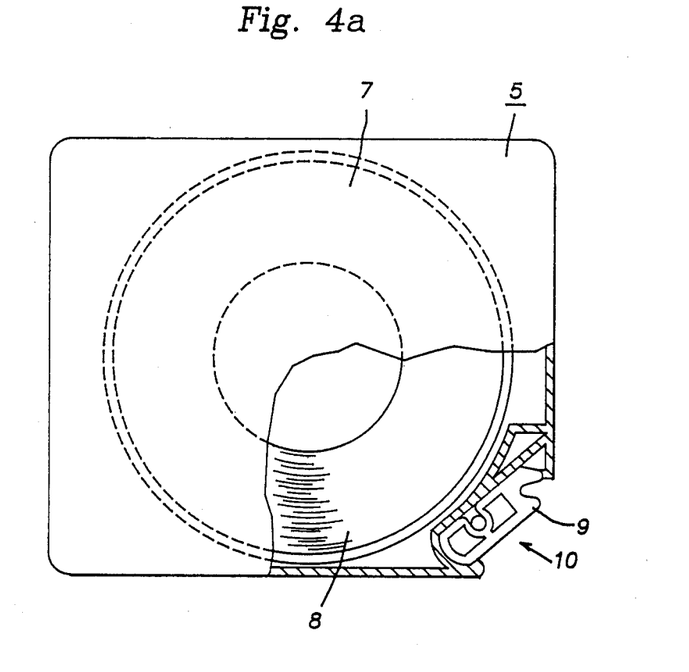
FIG. 4a is a plane view of a tape cartridge used for the invention with a portion broken away.
Figure 4B:
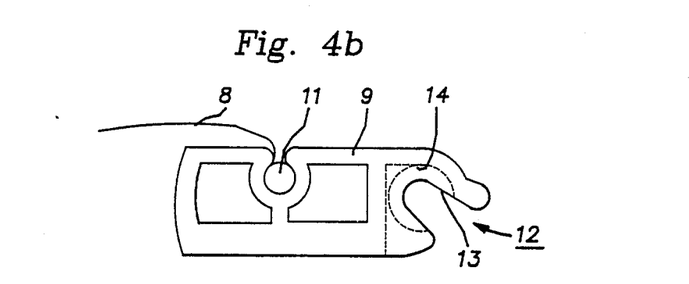

The tape cartridge 5 may be in the form of one which is commonly called "IBM 3480" as described in Japanese Application Laying-Open No. 171,773/1983, for example. The tape cartridge 5 has the signle reel 7 contained therein and the leader block 9 provided at the leader end of the tape 8 wound on the single reel 7 as shown in FIGS. 4a and 4b. The leader block 9 is removably engaged in an opening 10 in the tape cartridge 5. The tape 8 is connected to the leader block 9 by engaging the leader end of the tape 8 with the leader block 9 at its side recess by a cylindrical pin 11. A slot 12 formed in the end of the leader block 9 includes a slot portion 13 which is narrower in view of the width of the tape 8 and a slot portion 14 which is wider in view of the width of the tape 8, as shown in FIG. 4b.

As shown in FIGS. 1 through 3, pins 15 and 15 may be provided on the chassis 1 to control the pivotal movement of the holder base plate 4. The pins 15 and 15 extend through longitudinal holes 16 and 16 in the other ends of the holder base plate 4 and have stops 17 and 17 provided at the top ends thereof, respectively. Coil springs 18 and 18 on the pins 15 and 15 between the chassis 1 and the holder base plate 4 serve to urge the holder base plate 4 in a direction in which it moves far away from the chassis 1.

A spur wheel 20 having a gear 19 provided on the periphery of the wheel 20 is rotatably mounted by an axis 21 on the holder base plate 4 and is rotated in both directions by gear drive mechanism not shown including a motor and worm gears. An arm 22 is pivotally mounted by a pivotal pin 23 on the spur wheel 20 at the lower face thereof and has an engagement groove 24 formed at a free end thereof.

Figure 5A:
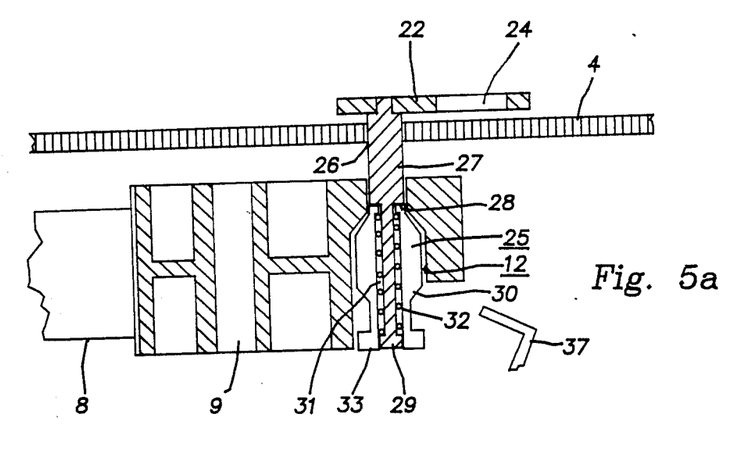
FIG. 5a illustrates in cross section the leader block being engaged with a drawing pin member.
Figure 5B:
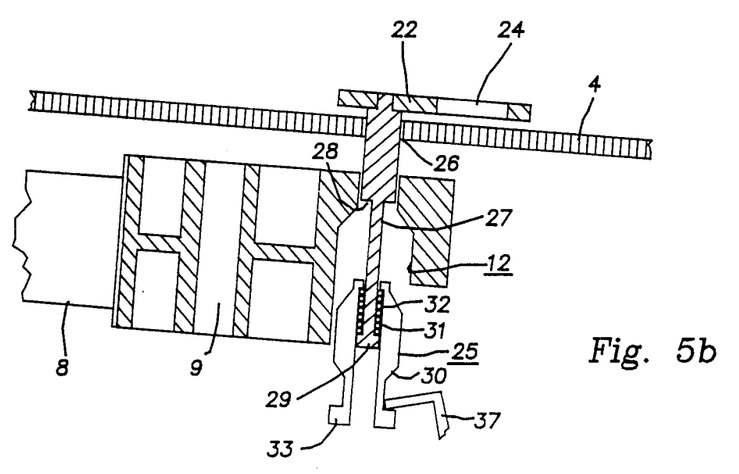
FIG. 5b illustrates in cross section the leader block being disengaged from the drawing pin member.

Drawing pin means 25 is provided at the lower face of the arm 22, as shown in FIGS. 5a and 5b. A drawing pin 27 extends downwardly from the arm 22 through a guide groove 26 in the holder base plate 4 and has a shoulder 28 formed thereon by thinning the pin 27 and a stop 29 provided at the lower end thereof.

An engagement member 30 is slidably mounted on the pin 27 and upwardly urged by a coil spring 32 disposed around the thinned pin 27 within the hollow portion 31 of the engagement member 30. The engagement member 30 has the peripheral configuration complementary of the inner configuration of the slot 12 in the leader block 9 and a flange 33 provided at the lower end thereof. As shown in FIGS. 5a and 5b, the height of the leader block 9 is so set that it is larger than the width of the tape 8.

A subsidiary chassis 35 is provided by connecting members 34 and 34 extending from and below the chassis 1 as shown in FIGS. 2 and 3. A pair of locking arms 36 and 36 having notches 71 and 71, respectively are pivotally provided by a pair of pivotal pins 38 and 38 on the subsidiary chassis 35 at its brackets 73 and 73 to lock the holder base plate 4 at the operative position of the tape cartridge 5 and a control arm 37 is pivotally provided by a pivotal pin 39 on the subsidiary chassis at its bracket 73 and 73 to engage with the flange 33 of the engagement member 30. A pair of locking pins 40 and 40 are provided on the cartridge holder 6 so as to associate with the notches 71 and 71 of the pair of locking arms 36 and 36.

Figure 6:
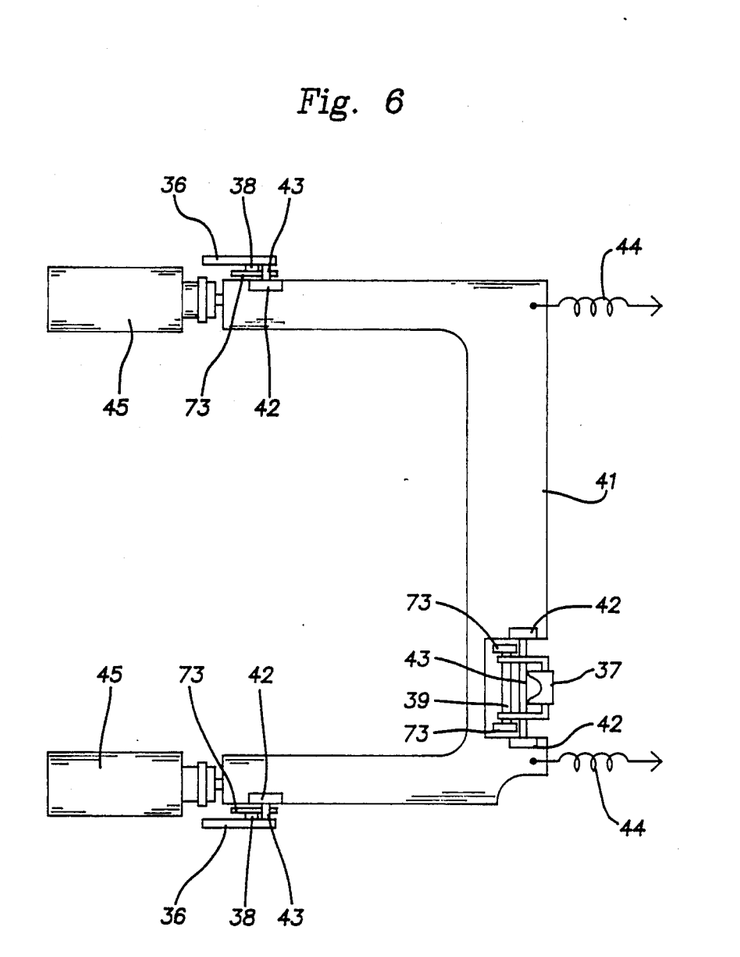
FIG. 6 illustrates in plane view locking arms and a control arm in an engagement condition.

As shown in FIGS. 2 and 3 and FIG. 6, the pair of locking arms 36 and 36 and the control arm 37 are associated with a slidable plate 41 in the form of C shape as shown in FIG. 6. The slidable plate 41 at its four brackets 42, 42, 42 and 42 are connected with the pair of locking arms 36 and 36 and the control arm 37 at their middle portions by three connecting pins 43, 43 and 43. A pair of coil springs 44 and 44 urge the slidable plate 41 in a rightward direction of FIG. 6 while a pair of plungers 45 and 45 serve to move the slidable plate 41 in a leftward direction against the coil springs 44 and 44 when electrically excited.

The guide groove 26 in the holder base plate 4 has the whole configuration shown in FIG. 1. A control pin 47 may be provided on the holder base plate 4 near an acute curve portion 46 of the guide groove 26 and serve to be associated with the engagement groove 24 in the arm 22. The acute curve portion 46 of the guide groove 26 is positioned corresponding to the drawing pin 27 when the axis 21 of the spur wheel 20, the pivotal pin 23 of the arm 22 and the drawing pin 27 are arranged in a substantially straight line.

Figure 7A:
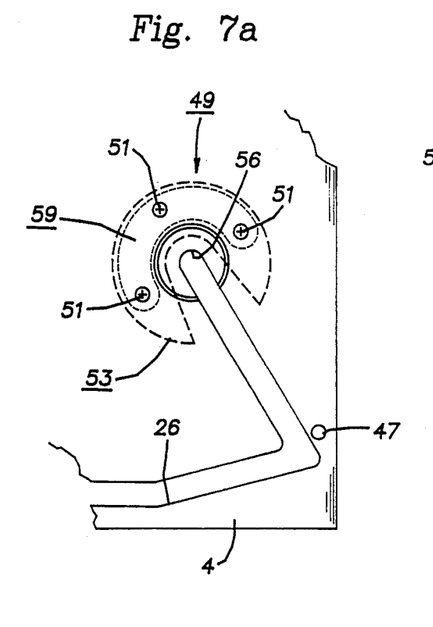
FIG. 7a illustrates in plane view positioning means for a drawing pin member.
Figure 7B:
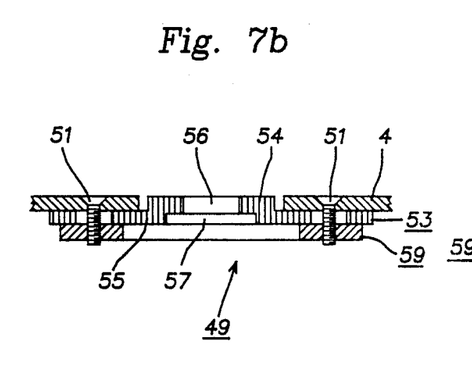
Figure 7C:
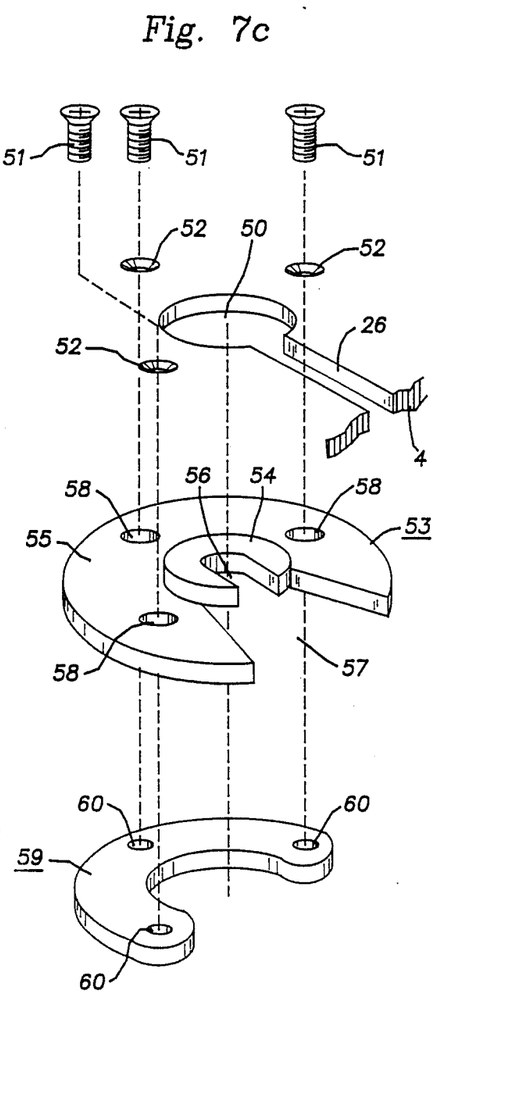

There is shown in FIGS. 7a through 7c positioning means 49 for the drawing pin means 25 provided on the holder base plate 4 corresponding to the end position of the guide groove 26. The positioning means 49 serves to make a rotational axis of a winding reel 48 in the magnetic instrument consistent with the center of the drawing pin means 25 at the position where the leader block 9 is mounted on the winding reel 48. A circular hole 50 of large diameter is provided in the holder base plate 4 corresponding to the rotational center position of the winding reel 48 so that it communicates with the guide groove 26.

The positioning means 49 comprises a positioning plate 53 including a central portion 54 and a peripheral portion 55. The central portion 54 of the positioning plate 53 has a notch 56 of the same width as that of the guide groove 26 while the peripheral portion 55 has a notch 57 of width larger than that of the notch 56 of the central portion 54 so that the notch 57 communicates with the notch 56. The positioning means 49 also comprises an arcuate locking plate 59 provided on the positioning plate 53. Three screws 51 extend through three holes 52 in the holder base plate 4 and then through three holes 58 in the positioning plate 53 which are of diameter larger than the diameter of the screws 51 and are secured to the arcuate locking plate 59 by spirally engaging with three tap holes 60 in the arcuate locking plate 59, respectively.

Figure 8:
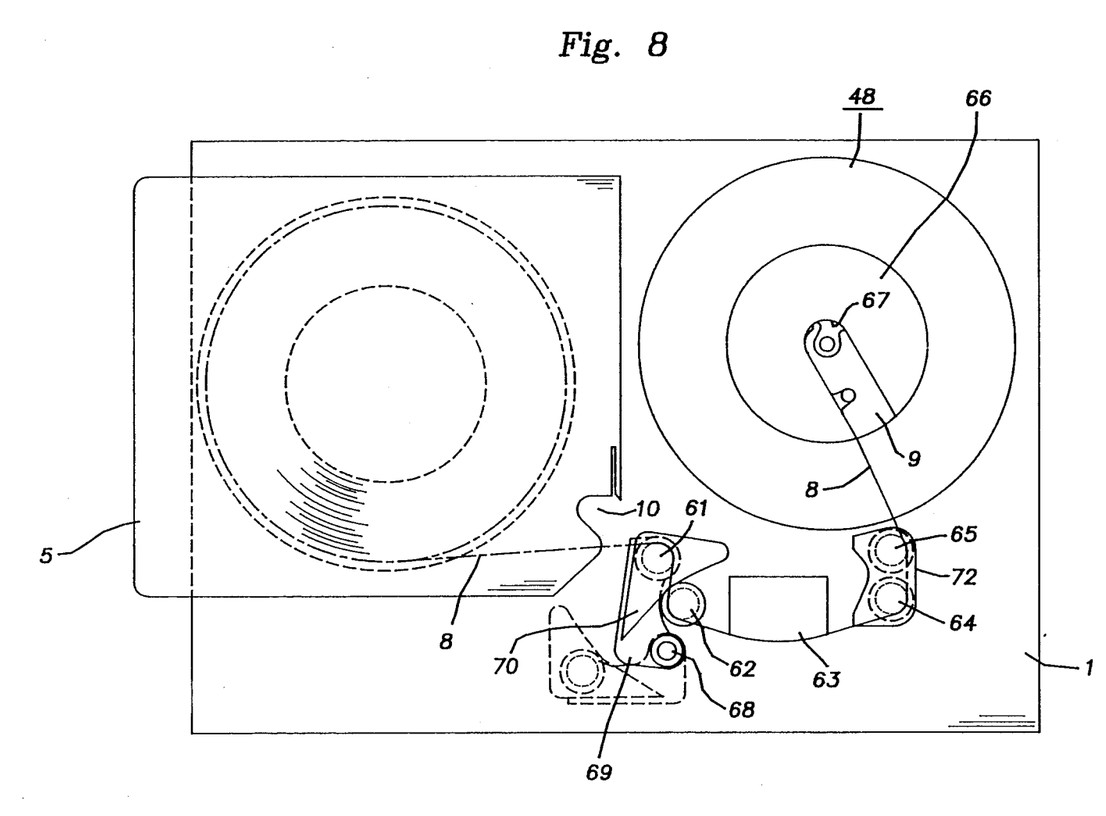
FIG. 8 illustrates a tape running path of the apparatus of FIG. 1.
Figure 11:
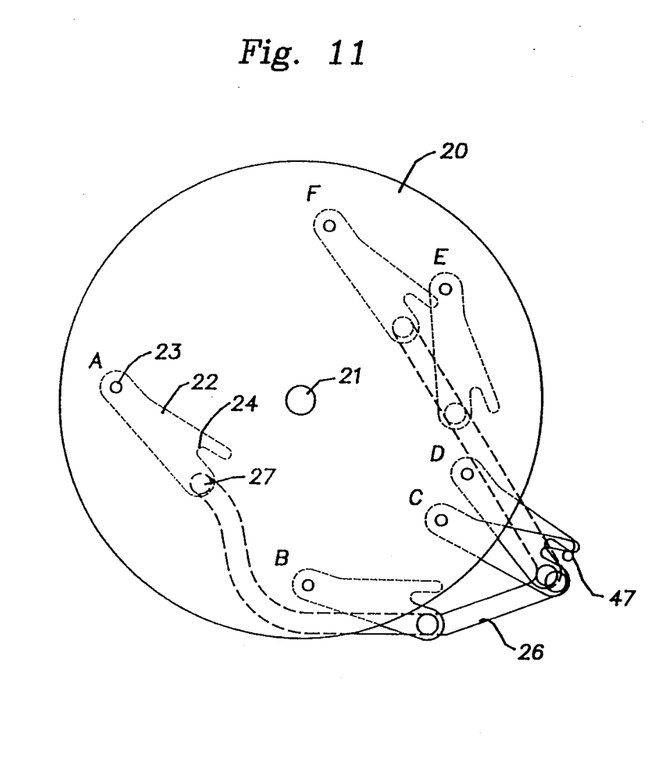
FIG. 11 illustrates in plane view positions where a drawing pin member is operated.

As shown in FIG. 8, there is formed a tape running path which is determined by tape guides 61 and 62, a magnetic head 63, the guides 64 and 65 and the winding reel 48 which are in turn disposed in a complicated positional relation to each other within the magnetic instrument so that the magnetic storage is compacted. A guide path is determined corresponding to the tape running path to guide the leader block 9 from the opening 10 in the cartridge 5 to a recess 67 in a hub 66 of the winding reel 48. As shown in FIGS. 1 and 11, the guide groove 26 has the acute curve portion 46 produced in order to compact the magnetic instrument.

The tape guides 62, 64 and 65 are secured to the chassis 1 while the tape guide 61 is provided on a pivotal plate 69 which is pivotally mounted on the chassis 1 by a pivotal pin 68. Thus, it will be noted that the tape guide 61 can be disposed at the position where the pivotal plate 69 is pivotally moved by a drive mechanism which will be described with reference to FIGS. 9 and 10 to the position of the dotted line in FIG. 8 so that the tape guide 61 never disturbs the leader block 9 from passing therethrough when the tape 8 is drawn out of the tape cartridge 5 or when the tape enters the tape cartridge 5 so as to be contained therein. A leader block guide 70 may be provided on the pivotal plate 69 to guide the top of the leader block 9 without contacting with the tape 8 so that the leader block 9 is accurately positioned in the opening 10 in the tape cartridge 5 when the tape 8 enters the tape cartridge 5.

Also, a leader block guide 72 may be provided on the tape guides 64 and 65 to guide the top of the leader block 9 without contacting with the tape 8 so that the leader block 9 never engages with the tape guides 64 and 65.

Figure 9:
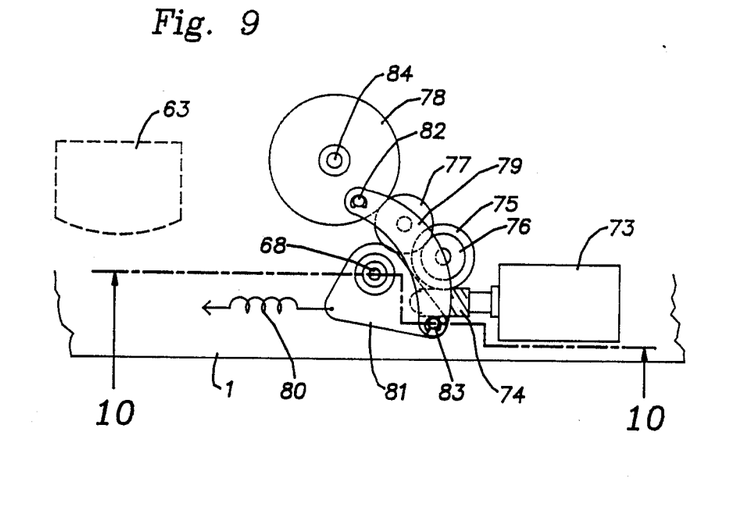
FIG. 9 illustrates in bottom view a drive mechanism for a tape guide.
Figure 10:
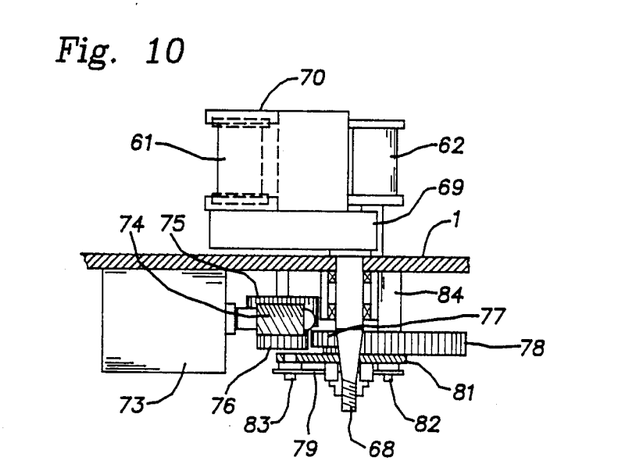
FIG. 10 illustrates the drive mechanism of FIG. 9 in cross section taken along the line 10—10 of FIG. 9.

A drive mechanism for the pivotal plate 69 is illustrated in FIGS. 9 and 10. The drive mechanism comprises an electric motor 73 having a worm gear 74 connected to a rotary shaft of the electric motor 73. The worm gear 74 engages with a spur gear 75 rotatably mounted on the chassis 1 and having a spur gear 76 coaxially mounted on the spur gear 75. The spur gear 76 engages with a spur gear 77 rotatably mounted on the chassis 1, which spur gear 77 engages with a gear provided on a control disk 78 rotatably mounted on the chassis 1 by an axis 84 of the control disk 78. Thus, the electric motor 73 drives the control disk 78 through the spur gears 75, 76 and 77. There is provided an arm 79 having one end pivotally connected by a pivotal pin 82 to the control disk 78 and the other end pivotally connected by a pivotal pin 83 to a second pivotal plate 81. The second pivotal plate 81 is urged by a spring 80 in a clockwise direction as viewed in FIG. 9 with the result that a transmission gear from the worm gear 74 to the pivotal plate 81 is prevented from being loosened. The second pivotal plate 81 is connected through the pivotal pin 68 to the first pivotal plate 69 integrally therewith. Thus, it will be noted that the pivotal plate 69 is swingingly driven by the electric motor 73.

An operation of the apparatus for drawing the leader block out of the tape cartridge will be described hereinjustbelow.

In case of the holder base plate 4 being located at the tape cartridge loading position where the holder base plate 4 is pivotally moved upwardly by the coil springs 18 and 18 as shown in FIG. 3, the slidable plate 41 is held at the leftward position by the pair of locking arms 36 and 36 and the corresponding locking pins 40 and 40. The control arm 37 is in the condition in which it is pivotally moved in a counterclockwise direction of FIG. 3 to be engaged with the flange 33 of the engagement member 30 of the drawing pin means 25, which causes the engagement member 30 to be pushed downwardly against the coil spring 32 as shown in FIG. 5b.

In such a condition, the tape cartridge 5 can enter the cartridge holder 6 without any disturbance from the drawing pin means 25. After the tape cartridge 5 enters the cartridge holder 6, the holder base plate 4 is pushed down against the coil springs 18 and 18.

When the tape cartridge 5 is brought to the operative position as shown in FIG. 2, the pair of locking pins 40 and 40 reach the notches 71 and 71 in the pair of locking arms 36 and 36, and then the slidable plate 41 is moved in a rightward direction by the coil springs 44 and 44, which causes the locking arms 36 and 36 and the control arm 37 to be pivotally moved in a clockwise direction. At this position, the holder base plate 4 is locked by the pair of locking arms 36 and 36 while the drawing pin means 25 engages the leader block 9 as shown in FIG. 5a because the control arm 37 is disengaged from the flange 33 of the engagement member 30 of the drawing pin means 25.

Thus, since the leader block 9 is connected to the drawing pin means 25, the leader block 9 is moved along the guide path by the drawing pin means 25 as shown in FIG. 11 which illustrates the movement of the arm 22 associated with the drawing pin means 25.

The arm 22 in the condition of the tape cartridge 5 being located at the operative position as shown in FIG. 21 is positioned at A in FIG. 11. When there is generated a predetermined instruction for moving the leader block 9 from the position A to the recess 67 in the winding reel 48 to engage the leader block 9 with the winding reel 48, the spur wheel 20 is rotated by the gear drive mechanism in a counterclockwise direction. At that time, a reel drive mechanism which engages with the single reel 7 in the tape cartridge 5 applies a back tension to the tape 8 so that the tape is not loosened while drawn out and the pivotal plate 69 is moved to the position shown in the dotted line of FIG. 8 so as not to disturb the movement of the leader block 9.

As the spur wheel 20 rotates, the drawing pin 27 is guided along the guide groove 26 to bring the arm 22 to the position B of FIG. 11. As the spur wheel 20 further rotates from the position B in a counterclockwise direction, the arm 22 is moved to the position C where the engagement groove 24 in the arm 22 engages with the control pin 47. It will be noted that the arm 22 is subject to the clockwise power about the pivotal pin 23 due to the back tension applied to the tape 8 during the movement of the arm 22 from the position A to the position C, with the result that the drawing pin 27 is controlled by the outer wall of the guide groove 26.

As the spur wheel further rotates, the axis 21 of the spur wheel 20, the pivotal pin 23 of the arm 22 and the drawing pin 27 are arranged in a straight line and then the arm 22 reaches the position D where the engagement groove 24 is nearly disengaged from the control pin 47.

Since the the movement of the arm 22 is controlled by the engagement groove 24 which engages with the control pin 47 during the movement of the arm 22 from the position C to the position D, the drawing pin 27 rotates within the acute curve portion 46 in a clockwise direction about the axis of the control pin 47 as viewed in FIG. 11. Thus, it will be noted that the drawing pin 27 is prevented from being moved along the guide groove 26 in a backward direction to its original position, which tends to occur due to the back tension applied to the tape 8. At the position D of the arm 22, the drawing pin 27 is removed from the outer wall of the guide groove 26. As the spur wheel 20 further rotates, the arm 22 is moved to the position E and then to the position F where the leader block 9 is engaged with the recess 67 in the winding reel 48.

It should be noted that while the tape 8 is being drawn out of the tape cartridge 5, the leader block guide 72 of FIG. 8 serves to guide the top of the leader block 9 without any engagement with tape guides 64 and 65.

The spur wheel 20 stops rotating when a detector detects the position F of the arm 22. Subsequently, the control disk 78 of FIG. 9 is driven to rotatably drive the electric motor 73 in a counterclockwise direction through the spur gears 75, 76 and 77. The rotation of the control disk 78 causes the second pivotal plate 81 to be rotatably driven in a counterclockwise direction through the arm 79 against the spring 80. Thus, it will be noted that the pivotal plate 69 is pivotally moved in a clockwise direction as viewed in FIG. 8 to move the tape guide 61 and the leader block guide 70 to the position of the solid line shown in FIG. 8 where the tape 8 is positioned along the running path shown in FIG. 8.

In this condition, the winding reel 48 is rotated by the reel drive mechanism not shown and the informations are stored or played back through the magnetic head 63.

An adjustment of the positioning means 49 for positioning the drawing pin 27 at the rotational axis of the winding reel 25 will be described with reference to FIGS. 7a through 7c. Firstly, the three screws 51 are unfastened so that the the central portion 54 of the positioning plate 53 is movably positioned within the circular hole 50 in the holder base plate 4. Then, the positioning plate 53 is adjusted so that the drawing pin 27 engaging with the innermost end of the notch 56 in the positioning plate 53 is positioned at the rotational axis of the winding reel 48 and thereafter the three screws 51 are fastened.

Removal operation of the tape cartridge 5 out of the magnetic instrument will be described hereinjustbelow. When it is detected that the tape 8 is wound up on the single reel 7 in the tape cartridge 5 as shown in FIG. 8, an instruction is generated to drive the electric motor 37 of FIG. 9 to thereby rotatably drive the control disk 78 through the spur gears 75, 76 and 77 in a clockwise direction. The rotation of the control disk 78 causes the second pivotal plate 81 to be rotatably driven through the arm 79 in a clockwise direction with the result that the first pivotal plate 69 is rotatably driven about the axis 68 in a counter-clockwise direction of FIG. 8. Thus, the tape guide 61 and the leader block guide 70 are moved to the position of the dotted line of FIG. 8 where they never disturb the movement of the leader block 9.

As the position of the pivotal plate 69 is detected by a detector, the spur wheel 20 is rotated in a clockwise direction. The reel drive mechanism engaging with the single reel 7 in the tape cartridge 5 drives the single reel 7 so that the tape 8 is wound without any looseness of the tape 8.

Thus, the leader block 9 is moved from the position F to the positon A to be returned to the opening 10 in the tape cartridge 5 and at that time the spur wheel 20 stops rotating.

During the removal operation of the tape cartridge 5, the leader block guide 72 serves to guide the top of the leader block 9 without its engagement with the tape guides 64 and 65. The leader block guide 70 serves to guide the leader block 9 so that the leader block 9 is accurately positioned at the opening 10 in the tape cartridge 10.

Figure 12:
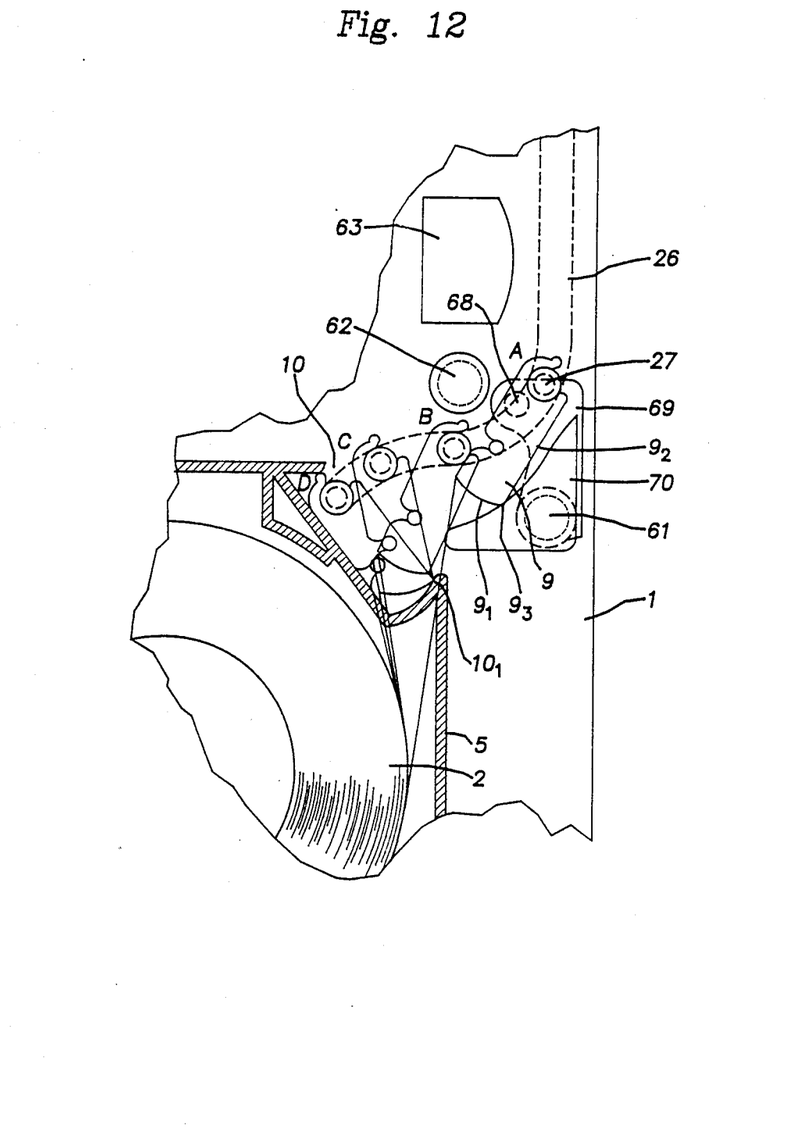
FIG. 12 illustrates in plane view the leader block being guided by the leader block guidemeans.

Guiding the leader block 9 will be described in more detail with reference to FIG. 12 hereinjust-below. When the drawing pin 27 is moved along the guide groove 26 in order to move the leader block 9 to the opening 10 in the tape cartridge 5, the rear face $9_1$ of the leader block 9 at its upper and lower ends slidably engages with the leader block guide 70. The state of slidable engagement of the leader block 9 is indicated by the position A of FIG. 12. As the drawing pin 27 further moves from the position A, the leader block 9 is moved to the position B of FIG. 12 where the side face $9_2$ of the leader block 9 is guided by the leader block guide 70 while the rear face $9_1$ of the leader block 9 is inserted into the opening 10 in the tape cartridge 5. As the drawing pin 27 further moves from the position B, the leader block 9 is moved to the position C of FIG. 12 where the side face $9_2$ of the leader block 9 is far away from the leader block guide 70 while the end $9_3$ of the rear face $9_1$ of the leader block 9 engages with the inner face $10_1$ of the opening 10 in the tape cartridge 5. As the drawing pin 27 further moves form the position C, the leader block 9 is rotated about its end $9_3$ and then the leader block 9 is moved to the position D of FIG. 12 where the leader block 9 is mounted on the tape cartridge 5 at the opening 10.

As an instruction is generated to remove the tape cartridge 5 out of the magnetic instrument, the pair of plungers 45 and 45 are electrically excited. Thus, the pair of plungers 45 and 45 move the slidable plate 41 against the coil springs 44 to rotate the pair of locking arms 36 and 36 and the control arm 37 in a counter-clockwise direction. Thus, the control arm 37 engages with the flange 33 of the engagement member 30 of the drawing pin means 25 and the pair of locking arms 36 and 36 are disengaged from the pair of locking pins 40 and 40.

As a result, while the engagement member 30 of the drawing pin means 25 is held at its position by the control arm 37, the holder base plate 4 rotates about the axis 3 by the coil springs 18 and 18 until it reaches the stops 17 and 17. Thus, the holder base plate 4 is brought to the position where the tape cartridge 5 can be removed out of thd magnetic instrument as shown in FIG. 3. The position of the holder base plate 4 is held by engagement of the pair of locking arms 36 and 36 with the pair of locking pins 40 and 40 although the pair of plungers 45 and 45 are interrupted from being electrically excited.

Figure 13:
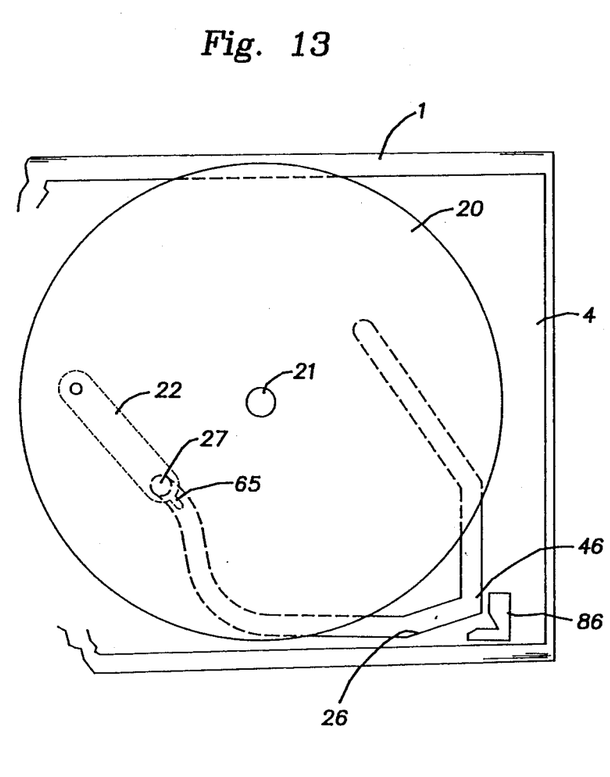
FIG. 13 illustrates in plane view a drawing pin member with modified means for preventing the drawing pin member from being moved in a backward direction to its original position.

FIG. 13 illustrates another embodiment of the invention in which means to prevent the drawing pin 27 from being moved back to its original position is modified. In this embodiment, the arm 22 comprises an engagement protrusion 85 in place of the engagement groove 24 and the control pin 47 of the aforementioned embodiment is replaced by a control block 86 provided on the holder base plate 4 and having a recess corresponding to the engagement protrusion 85 of the arm 22. While the arm 22 is moved to the position C to the position D, its movement is controlled by the engagement protrusion 85 which engages with the control block 86, the drawing pin 27 rotates within the acute curve portion 46 in a clockwise direction as viewed in FIG. 9 and therefore, the drawing pin 27 is prevented from being moved along the guide groove 26 in a backward direction to its original position, which tends to occur due to the back tension applied to the tape 8.

Although some embodiments of the invention have been illustrated and described with reference to the accompanying drawings, it will be apparent to those skilled in the art that they are by way of examples, and that various changes and modifications may be made without departing from the spirit and scope of the invention. For example, the invention may be applied to an apparatus in which the chassis having the magnetic head and the winding reel mounted thereon is moved so that the tape cartridge is removed out of the chassis without any movement of the tape cartridge. It should be understood that the invention is defined only by the the appended claims.

What is claimed is:

1. An apparatus for drawing out a leader block contained in a tape cartridge for a magnetic instrument having a single reel and connected to a leader end of a tape in the tape cartridge comprising:
    leader block guide means including a drawing pin to guide and drive said leader block along a guide path;

engagement means including an engagement member slidably mounted on said drawing pin, an urging member for urging said engagement member to engage with said leader block, and a control arm engaging said engagement member when said tape cartridge enters into and is removed from said magnetic instrument; and a holder base plate pivotally mounted on a chassis of said magnetic instrument and having a cartrdige holder and said leader block guide means provided thereon.

2. An apparatus for drawing out a leader block contained in a tape cartridge for a magnetic instrument as set forth in claim 1, and wherein said leader block guide means comprises a spur wheel rotatably mounted on said holder base plate and having a drawing pin provided thereon through an arm pivotally mounted on said spur wheel so as to be engaged with a slot in said leader block, said drawing pin engaging with a guide groove in said holder base plate.

* * * * *

UNITED STATES PATENT AND TRADEMARK OFFICE
CERTIFICATE OF CORRECTION

PATENT NO. : 4,832,284
DATED : May 23, 1989
INVENTOR(S) : Yoshihisa Inoue

It is certified that error appears in the above-identified patent and that said Letters Patent is hereby corrected as shown below:

Col. 1, line 22 after "block" insert --,--.

Col. 2, line 57 after "such as" insert --a--.

Col. 7, line 21 "37" should be --73--.

Col. 8, line 25 "thd" should be --the--.

Col. 9, line 12 "cartrdige" should be --cartridge--.

Col. 6, line 5 "21" should be --2--.

Signed and Sealed this

Thirtieth Day of January, 1990

Attest:

JEFFREY M. SAMUELS

Attesting Officer     Acting Commissioner of Patents and Trademarks